Feb. 3, 1959    M. J. OSBORNE    2,872,224
TURNBUCKLE
Filed July 11, 1957
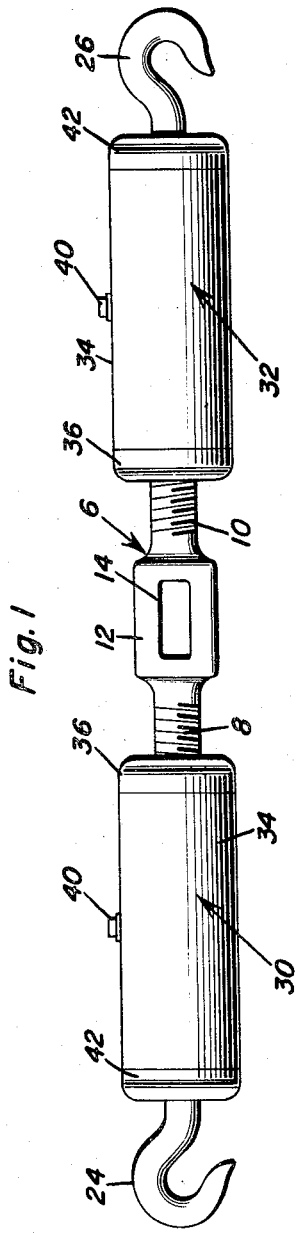
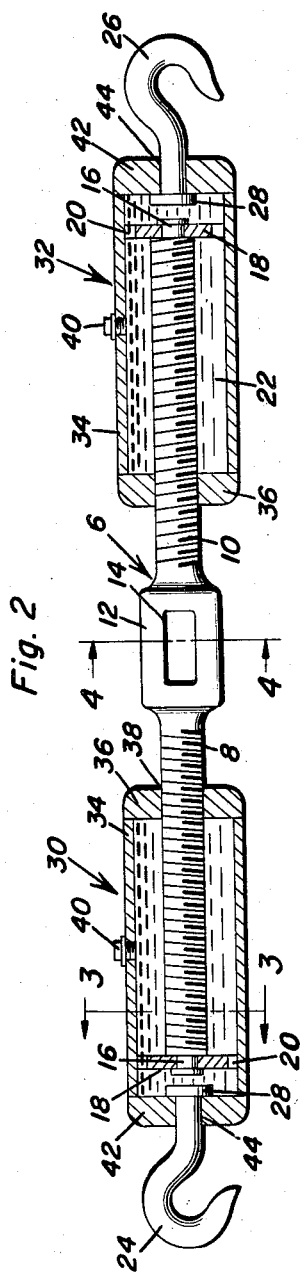
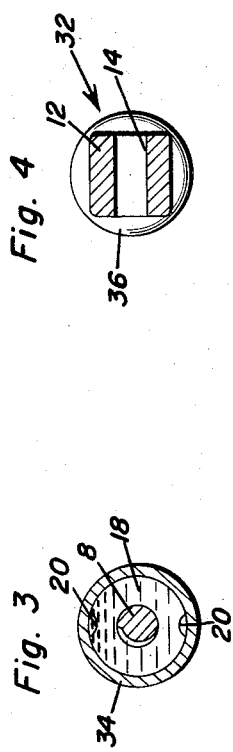
Marvin J. Osborne
INVENTOR.

United States Patent Office 2,872,224
Patented Feb. 3, 1959

2,872,224

TURNBUCKLE

Marvin J. Osborne, Casper, Wyo.

Application July 11, 1957, Serial No. 671,293

1 Claim. (Cl. 287—60)

The present invention relates to certain new and useful improvements in a turnbuckle which is such in construction that bending and distortion is reduced to a minimum and the likelihood of jamming and resistance to relative turning of the cooperating parts is minimized.

An object of the invention, more specifically speaking, is to incorporate in the turnbuckle construction lubricant containing members or couplings which function to provide a constant source of lubrication for the screw-threaded shank portions of the usual type adjusting screw or rod.

Another aspect of the invention has to do with a turnbuckle wherein a hook is swivelly mounted on one end of a lubricant containing and coupling member and said member is provided with a nut threaded on the cooperating screw-threaded shank, the shank extending into the body of said member in a manner to distribute stress and strain and rigidify the over-all construction.

Briefly summarized, the invention in a preferred embodiment thereof comprises a rod member having axially aligned screw-threaded shanks for left-hand and right-hand use, said shanks being connected together by a link and said link providing a tool grip.

The outer end of each shank is provided with a swivelly mounted washer and the washer equipped end is projected for operation into the lubricant containing chamber of the cylindrical or similarly constructed coupling member. At one end the coupling member is provided with a nut fixed in place and at the opposite end is provided with a swivelly mounted hook.

Other objects, features and advantages will become more readily apparent from the following description and the accompanying drawing.

In the drawing, wherein like numerals are employed to designate like parts throughout the views:

Fig. 1 is an elevational view of an improved turnbuckle constructed in accordance with the principles of the present invention;

Fig. 2 is a view of the same with parts in section and elevation;

Figs. 3 and 4 are sections on the lines 3—3 and 4—4, respectively, of Fig. 2, looking in the direction of the respective arrows.

Referring now to the drawings and to Figs. 1 and 2 in particular, the screw-threaded unit is denoted as an entity by the numeral 6. This is a one-piece so-called rod member which more specifically has end portions 8 and 10 provided with left-hand and right-hand screw threads providing axially aligned shanks. The inner adjacent ends of the oppositely threaded shanks are joined by a link 12 the opening or slot in which is denoted at 14. This slotted part provides a wrench grip; or a tool may be passed through the slot for rotating the turnbuckle in a generally well-known manner. The outer end of each shank has a reduced headed terminal 16 swivelly mounted on a washer 18. Stated otherwise, the washer is connected to the headed shank and the washer itself is provided with marginal notches or openings 20 for passage of the fluid oil or lubricant 22.

One of the purposes of the form of the invention depicted is to adjustably connect swivelly mounted hooks employed in connection with a chain (not shown) or the like for adjustably connecting the chain-ends. In any event, and regardless of the use of the device, it is the particular construction which is at bar here. With this in mind, one of the hooks is denoted at the left and designated by the numeral 24. The other hook which is identical is denoted at 26. Both hooks have a headed shank 28. The means swivelly connecting the headed shank of the hook to the screw-threaded shank 10 of the unit 6 is the same. However, for convenience of general distinction the means, called broadly a coupling or a connecting member, is denoted at the left by the numeral 30 and one at the right by the numeral 32. Structurally each member is the same in construction and therefore description of one will suffice for both. To this end the coupling is a hollow tubular member or cylinder 34 having a nut 36 welded to the inner end of the cylinder, the screw-threaded hole in the nut 38 being joined with the threaded shank. A filler hole is closed by a closing cap 40. The washer-equipped-end of the shank rides back and forth in the oil containing space or chamber of the cylinder. The left-hand or outer end of the cylinder is closed by a suitably fixed plug or equivalent head 42 having a hole 44 therein to swivelly mount the headed shank of the hook.

It will be evident from the description that the turnbuckle is novel, practical, safe to use, promotes a saving of time, is strong and reliable, and otherwise adapted to serve the particular purposes for which it has been perfected. As is the situation in connection with many implements and devices in the category under consideration, the mode of use and instructions for use will vary in different situations. Therefore, the disclosure relies primarily for its teaching and contribution to the art on the construction and arrangement depicted, as preferred embodiment, in the drawing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A turnbuckle comprising a pair of axially aligned companion shanks having left hand and right hand screw threads, respectively, a rigid but slotted tool grip interposed between the adjacent inner ends of the shanks and rigidly joining the shanks together to provide a unit, a nut threaded on each shank outwardly of said tool grip, a pair of axially aligned hollow cylinders having their adjacent inner ends axially aligned with and fixedly joined to their respective nuts, an end portion of each shank projecting axially and slidably into its cooperating cylinder, a headed terminal formed on each end portion, a stabilizing washer swivelly mounted on each headed terminal, said washers being confined for operation in the chamber portions of their respective cylinders and each washer being of an outside diameter approximately equivalent to the inside diameter of the cooperating cylinder, the marginal edge portions of said washers having lubricant clearance notches and said cylinder being adapted to be charged with a suitable lubricant, said shanks being of a cross-section less than the cross-section of the cylinders, a closing head affixed to the outer end of each cylinder and centrally apertured, and hooks adapted to be connected with chain links, each hook having a headed shank portion swivelly mounted in the opening provided therefor in the cooperating head, the headed end of the shank projecting into the chamber of the cylinder, whereby lubricant contained in said cylinder serves to lubricate the screw threads on the shank, the interior surfaces of the cylinder, marginal edges of the washer and the headed end of the shank of said hook.

References Cited in the file of this patent

UNITED STATES PATENTS

| | | |
|---|---|---|
| 189,854 | Fulton | Apr. 24, 1877 |
| 448,395 | Wheeler | Mar. 17, 1891 |
| 801,722 | Lane | Oct. 10, 1905 |
| 925,901 | Hardick | June 22, 1909 |
| 1,101,954 | Petry | June 30, 1914 |
| 1,131,846 | Lowe | Mar. 6, 1915 |
| 1,683,516 | Adams | Sept. 4, 1928 |

FOREIGN PATENTS

| | | |
|---|---|---|
| 687,843 | France | Aug. 13, 1930 |